(12) United States Patent
Ring et al.

(10) Patent No.: US 6,531,524 B2
(45) Date of Patent: Mar. 11, 2003

(54) POWDER COATING COMPOSITIONS

(75) Inventors: John Ring, Newcastle-upon-Tyne (GB); Gareth Dale Crapper, Tyne & Wear (GB); Kevin Jeffrey Kittle, Co. Durham (GB)

(73) Assignee: International Coatings Limited, London (GB)

( * ) Notice: Subject to any disclaimer, the term of this patent is extended or adjusted under 35 U.S.C. 154(b) by 0 days.

(21) Appl. No.: 09/749,880

(22) Filed: Dec. 29, 2000

(65) Prior Publication Data

US 2001/0006993 A1 Jul. 5, 2001

Related U.S. Application Data

(63) Continuation of application No. PCT/GB99/02105, filed on Jul. 2, 1999.

(30) Foreign Application Priority Data

Jul. 3, 1998 (DE) .............................. 9814534

(51) Int. Cl.$^7$ ................................. C08K 3/34
(52) U.S. Cl. ................ 523/205; 524/430; 524/437; 524/492; 523/216
(58) Field of Search ................ 523/205, 216; 524/430, 437, 492

(56) References Cited

U.S. PATENT DOCUMENTS

| | | | | |
|---|---|---|---|---|
| 3,607,337 A | | 9/1971 | Offenbach et al. ....... 106/288 Q |
| 3,816,154 A | | 6/1974 | Baldyga et al. ......... 106/308 O |
| 3,965,042 A | * | 6/1976 | Feldwick ..................... 252/455 |
| 4,003,866 A | * | 1/1977 | Paturle ..................... 260/17.4 |
| 4,371,638 A | | 2/1983 | Bernelin et al. ............. 523/427 |
| 4,414,279 A | | 11/1983 | Bernelin et al. ............. 428/413 |
| 4,885,032 A | * | 12/1989 | Okai .......................... 75/251 |
| 4,976,777 A | * | 12/1990 | Ozawa ........................ 75/255 |
| 5,015,671 A | | 5/1991 | Ono et al. .................. 523/402 |
| 5,171,653 A | * | 12/1992 | Jugle .......................... 430/108 |
| 5,206,332 A | | 4/1993 | Hammer et al. ............. 528/118 |
| 5,319,001 A | | 6/1994 | Morgan et al. ............. 523/205 |
| 5,470,893 A | | 11/1995 | Sinclair-Day et al. ...... 523/205 |
| 5,491,202 A | | 2/1996 | Umehara et al. ........... 525/438 |
| 5,506,083 A | * | 4/1996 | Nash .......................... 430/106 |
| 5,516,614 A | * | 5/1996 | Nash ........................ 430/106.6 |
| 5,718,753 A | * | 2/1998 | Suzuki ....................... 106/403 |
| 5,735,944 A | | 4/1998 | Haubennestel et al. ..... 106/272 |
| 5,856,378 A | | 1/1999 | Ring et al. .................. 523/205 |

FOREIGN PATENT DOCUMENTS

| | | |
|---|---|---|
| EP | 0003932 A | 9/1979 |
| EP | 0300818 A2 | 1/1989 |
| EP | 0372860 A1 | 6/1990 |
| EP | 0539385 B1 | 10/1995 |
| FR | 1585800 A | 1/1970 |
| GB | 1545780 | 5/1979 |
| GB | 2311527 A | 10/1997 |
| JP | 55-123678 A | 9/1980 |
| WO | WO 94/11446 | 5/1994 |
| WO | WO 97/08250 | 3/1997 |

* cited by examiner

Primary Examiner—Edward J. Cain
(74) Attorney, Agent, or Firm—Proskauer Rose LLP; Kristin Neuman, Esq.

(57) ABSTRACT

A powder coating composition of the invention comprises a film-forming polymeric component having a d(v,50) in the range or from 25 to 50 microns or a d(v,70) in the range of from 25 to 70 microns, which composition incorporates by dry-blending at least one appearance-modifying additive component and a further component comprising wax-coated silica or consisting of alumina together with aluminum hydroxide. The appearance-modifying additive may be a gloss-reducing component, a texturing component, a metallic or mica component, a coloring pigment, or a further film-forming polymeric material comparable with the first film-forming polymeric material and differing in coloration therefrom, and the further additive may be alumina together with aluminum hydroxide, wax-coated silica, or a combination thereof. Preferably, no more than 70% by volume of the particles in the film-forming polymeric material are less than 50 microns. A kit of the invention comprises the individual additive components prior to mixing. The kit allows for the flexible production of a variety of finishes from a gloss powder coating composition, for example, a matte, textured, metallic, or sparkle finish, a matte metallic finish, an antique finish, or a contrast texture or metallic sparkle finish.

47 Claims, No Drawings

POWDER COATING COMPOSITIONS

CROSS-REFERENCE TO RELATED APPLICATIONS

This application is a continuation of the U.S. National Phase designation of co-pending International Application No. PCT/GB99/02105, filed Jul. 2, 1999, in the United Kingdom.

FIELD OF THE INVENTION

This invention relates to powder coating compositions and to their use.

Powder coatings form a rapidly growing sector of the coatings market. Powder coatings are solid compositions which are generally applied by an electrostatic spray process in which the powder coating particles are electrostatically charged by the spray gun and the substrate is earthed. Charging of the powder in the spray gun is effected by means of an applied voltage or by the use of friction (tribo-charging). The applied composition is then heated to melt and fuse the particles and to cure the coating. The powder coating particles which do not adhere to the substrate can be recovered for reuse so that powder coatings are economical in use of ingredients. Also, powder coating compositions are generally free of added solvents and, in particular, do not use organic solvents and are accordingly non-polluting.

Powder coating compositions generally comprise a solid film-forming resin, usually with one or more coloring agents such as pigments, and optionally also contain one or more performance additives. They are usually thermosetting, incorporating, for example, a film-forming polymer and a corresponding curing agent (which may itself be another film-forming polymer).

The compositions are generally prepared by intimately mixing the ingredients (including coloring agents and performance additives) for example in an extruder, at a temperature above the softening point of the film-forming polymer(s) but below a temperature at which significant pre-reaction would occur. The extrudate is usually rolled into a flat sheet and comminuted, for example by grinding to the desired particle sizes ("micronizing").

The particle size distribution required for most commercial electrostatic spray apparatus is up to 120 microns, often between 10 and 120 microns, with a mean particle size within the range of 15 to 75 microns, preferably 25 to 50 microns, more especially 20 to 45 microns.

BACKGROUND OF THE INVENTION

Currently, powder coating manufacturing methods allow the manufacturer to offer commercially a range of full gloss coatings in a variety of colors. The range of products available in different finishes is, however, limited.

Reduction of gloss to some other lower level, for example satin gloss (55–65% gloss) or matte (<30% gloss), is achieved by creating a surface which is rough on a microscopic scale. This surface roughness must be sufficient to cause a reduction in the specular reflection from the film by scattering the incident light; if it is visible, however, a texturing effect is achieved in the film.

In liquid paints this gloss reduction is usually achieved by the use of pigment and/or filler particles at high volume concentrations. However, this technique cannot be used as the sole route to gloss reduction in powder coatings as a high content of filler particles would unacceptably lead to too reduced a surface flow during curing.

Gloss reduction and/or texture in powder coatings may be achieved by using incompatible components or components that generate incompatibility. For example, an acrylic component and a polyester, epoxy, polyester-epoxy or polyurethane component are incompatible, and cannot be blended to form a single (stable) phase. Incompatibility during film formation can also be achieved by using components that are initially miscible (compatible) but that become incompatible during curing. Thus, for example, two systems of similar chemistry and approximately the same gel time are compatible, but components with different gel times are initially compatible but become incompatible as curing (and molecular weight build-up) proceeds. Materials that are incompatible during film-formation can separate into different phase domains which can give rise to incompatibility effects such as matting. Aside from this, the presence of two materials of different surface tension at the surface of the film and in discrete areas/domains can lead to surface disruption (texturing).

In practice, for gloss reduction, the procedure used is to set up reactions within the curing film such that two different gelation rates are set up within the curing matrix. With acid-functional polyesters, for example, a fast gelling (reacting) powder and a slow gelling powder may be manufactured separately using polyesters of different functionality, and mixed after the micronizing stage or, more usually, the components are mixed prior to micronizing. The components should have the same color and particle size. The faster gelling domains form particles which disrupt the surface flow of the slower gelling portion of the matrix. Production of small batches of reduced-gloss coating composition, however, is uneconomic. For mixing after the micronizing stage, a product called 'gloss killer' is often used, available from the company Tiger. However, this product, a clear powder coating of a conventional particle size, can be added only in limited amounts to a conventional colored powder coating before the presence of the gloss killer can be detected from the sparkle generated by the particles of the clear gloss killer powder in the film. Therefore, the product is limited to adjusting gloss by a few percentage points. Similarly, waxes and various extenders can be used to produce satin finishes, but do not provide a matte finish. Gloss-reducing agents also include a second catalyst which will give a much faster gel time than the principal catalyst used to cure the film, e.g., for polyesters the Ciba-Geigy products "XG 125" (zinc N-ethyl-N-phenyl-dithiocarbamate) and "XB 3329" (the zinc salt plus a matting wax that further reduces the gloss level, possibly through incompatibility), and, for pure epoxy and epoxy-polyester (hybrid) systems, a catalyst which has a chemical structure that causes two rates of gelation on curing, e.g., the products described in GB 1,545,780, and including the Hüls products B55 and B68 which are adducts of pyromellitic acid and 2-phenylimidazaline.

For texture, a number of agents can be used to achieve different surface effects, acting by disrupting the flow of the polymer film. For a stippled finish, micronized PTFE (polytetrafluoroethylene) is used. For a wrinkle finish, cellulose acetate butyrate resin (CAB) or acrylate homo- and co-polymers may be used. In addition, texturing agents based on high molecular weight thermoplastics are commonly added to thermosetting powder coatings, giving rise to uniformly poor flow across the surface, which manifests itself as a texture. PTFE is preferably added to the premix before extrusion and is fully incorporated into the extrudate. However, the micronized PTFE has to be prepared in a particular fashion to give batch-to-batch consistency. CAB may be added to the finished powder or, preferably, is also added at the premix stage before extrusion; it does not melt in the extruder, and the inhomogeneous dispersion thereby produced gives rise to the texture. Some texturing agents, however, for example Acronal™ 4F, have to be added post-extrusion since the extrusion process would render them ineffective by mixing them intimately with the continuous phase of the coating system. However, powders containing post-additives show inconsistency in the texturing effect on application of the powder. A further post-extrusion texturing additive is the ester-modified polyether product Powdermate 508TEX sold by the company Troy. However, this product has to be added to a powder whose original gloss is dictated by the formulation used.

The production of metallic effect powder coatings is normally achieved by bonding the metallic pigment to the powder coating. If the pigment is incorporated into the powder coating composition with the other ingredients in the extruder the luster effect is likely to be destroyed by the strong shear forces found in the extruders and in the subsequent micronizing step. If, however, the metallic flake is simply incorporated by dry-blending, the loose metallic flakes in such processes can cause unwanted electrical discharge within the spray gun, and the presence of free metallic pigments within the powder(s) also represents a significant increase in explosion hazard. These problems are overcome in commercial operation by a mechanofusion process whereby the individual flakes of metallic pigment are bonded to the surface of conventional powder coating particles. Conventionally, however, this technique has not been applied beyond the specific field of metallic or luster finishes.

There is accordingly a need for powder coating compositions in a variety of aesthetic finishes, including a range of reduced-gloss finishes and textured and metallic finishes, which avoid the problems mentioned above.

SUMMARY OF THE INVENTION

The present invention provides a dry-blended powder coating composition including: one or more film-forming polymeric components containing particles and having: a $d(v,50)$ of from 25 to 50 microns, a $d(v,70)$ of from 25 to 70 microns, or no more than 70% by volume of the particles being less than 50 microns; at least one appearance-modifying additive component; and a further additive containing alumina, aluminum hydroxide, wax-coated silica, or a combination thereof. Advantageously, the one or more film-forming polymeric components constitute the major proportion of the composition. In one preferred embodiment, the one or more film-forming polymeric components exhibits a $d(v,70)$ of from 25 to 70 microns and a $d(v,20)$ of from 8 to 30 microns.

The at least one appearance-modifying additive component includes, for example: (1) a gloss-reducing additive component, (2) a texturing agent component, (3) a metallic or mica pigment, optionally bonded to a second film-forming polymeric material, (4) a coloring pigment or pigment concentrate, (5) a third film-forming polymeric material compatible with the first film-forming component and differing in coloration therefrom. In one embodiment, the third film-forming polymeric material has at least 90% by volume of its particles being no more than 20 microns. In another embodiment, the third film-forming polymeric material exhibits: (i) a $d(v,50)$ of from 25 to 50 microns and a $d(v,99)$ of from 60 to 120 microns, or (ii) no more than 70% by volume of the particles being less than 50 microns.

Advantageously in these embodiments, the composition contains at least 60% by weight of film-forming polymeric material(s), which collectively have: (i) a $d(v,50)$ of from 25 to 50 microns and a $d(v,99)$ of from 60 to 120 microns, or (ii) no more than 70% by volume of the particles being less than 50 microns. Also, the film-forming polymeric component will generally constitute the major proportion of the total film-forming material and preferably the major proportion of the powder coating composition of the invention.

When present, the metallic or mica pigment is generally incorporated into the composition in an amount of no more than 10% by weight. In one preferred embodiment, the metallic or mica pigment can be bonded to an uncolored film-forming polymeric material having a $d(v,50)$ of from 15 to 50 microns or a $d(v,70)$ of from 20 to 70 microns. In another preferred embodiment, the metallic or mica pigment also contains 2 to 40% by weight of metallic or mica pigment bonded to the uncolored film-forming polymeric material.

When present, the gloss-reducing additive is generally incorporated in an amount of no more than 30% by weight, based on the total weight of the composition. In a preferred embodiment, the one or more film-forming polymeric components include a first acid-functional polyester, while the gloss-reducing component includes an uncolored film-forming polymeric material containing a second acid-functional polyester, which has a higher functionality than the first acid-functional polyester. Preferably, the gloss-reducing additive has a particle size such that at least 90% by volume of particles are less than 50 microns and such that the mean particle size is less than 30 microns.

When present, the texturing agent is generally incorporated in an amount of no more than 5% by weight, based on the total weight of the composition.

When present, the coloring pigment or the colored film-forming polymeric material are incorporated in an amount of no more than 5% by weight, based on the total weight of the composition. In this embodiment, at least 90% by volume of the particles are preferably no more than 20 microns and is preferably compatible with the film-forming polymeric component.

In a preferred embodiment, the further additive is present in an amount of no more than 5% by weight, based on the weight of the total composition.

Preferably, the composition includes at least 70% by weight of a colored film-forming polymeric material having: a $d(v,50)$ of from 25 to 50 microns, a $d(v,70)$ of from 25 to 70 microns, or no more than 70% by volume of the particles being less than 50 microns. Alternately, the film-forming polymeric component may exhibit a $d(v,50)$ of from 35 to 45 microns and a $d(v,99)$ of from 80 to 100 microns. In another alternative embodiment, the film-forming polymeric component exhibits a $d(v,70)$ of from 25 to 70 microns, while the further additive includes wax-coated silica. In yet another alternative embodiment, the film-forming polymeric component exhibits a $d(v,70)$ of from 40 to 60 microns and a $d(v,20)$ of from 15 to 25 microns.

In another embodiment, the film-forming polymeric component includes a particulate powder in the form of a fused or bonded composite agglomerate.

Another aspect of the invention relates to a dry-blended powder coating composition including: (a) a colored film-forming polymeric material: (1) having a $d(v,50)$ in the range of from 25 to 50 microns and a $d(v,99)$ in the range of from 60 to 120 microns, or (2) in which no more than 70% by volume of the particles are less than 50 microns; (b) at least one appearance-modifying additive including: (1) a gloss-reducing additive component, (2) a texturing agent component, (3) a metallic or mica pigment, optionally bonded to a film-forming polymeric material, (4) a coloring pigment component, (5) a film-forming polymeric material, compatible with the film-forming component (a) and different in color therefrom, and in which at least 90% by volume of the particles are no more than 20 microns, or (6) a film-forming polymeric material, compatible with the film-forming component (a) and different in color therefrom, and either: (1) having a d(v,50) in the range of from 25 to 50 microns and a d(v,99) in the range of from 60 to 120 microns, or (2) in which no more than 70% by volume of the particles are less than 50 microns; and (c) a further additive including alumina, aluminum hydroxide, wax-coated silica, or a combination thereof. Advantageously, the composition contains at least 60% by weight of the film-forming polymeric material(s), which collectively have a d(v,50) of from 25 to 50 microns and a d(v,99) of from 60 to 120 microns, or in which no more than 70% by volume of the particles are less than 50 microns.

Another aspect of the invention relates to a kit including the following separate particulate components for dry-blend mixing into powder coating compositions for the preparation of powder coatings in a number of different finishes: (a) at least one appearance-modifying additive including: (1) a gloss-reducing component, (2) a texturing component, (3) a metallic or mica pigment component, (4) a coloring pigment or pigment concentrate component, or (5) a colored film-forming polymeric material having a d(v,90) of no more than 20 microns; and (b) a further additive comprising alumina, aluminum hydroxide, wax-coated silica, or a combination thereof. Advantageously, the kit can include components (1), (2), and (3), and optionally with one or more coloring pigments or pigment concentrates (4) or colored film-forming polymeric materials (5).

In a preferred embodiment, the at least one appearance-modifying additive is in the form of a bonded masterbatch in which a non-film-forming additive is bonded to a film-forming polymeric component.

In another preferred embodiment, the kit further includes an uncolored film-forming polymeric material.

One or more of the appearance-modifying additive components may, if desired, be in the form of a bonded "masterbatch" in which non-film-forming additive particles are bonded to film-forming polymeric powder material.

As will be understood in the art, the volume percentiles d(v,x) indicate for a stated particle size d the percentage (x) of the total volume of the particles that lies below the stated particle size. Thus, for instance, d(v,50) is the median particle size of the sample, and on a particle size distribution graph d(v,70) is the point on the curve read along the particle size axis where the area under the curve below this particle size represents 70% by volume of the particles. Thus, d(v,70)=70 microns indicates that 70% of the particles are below 70 microns (but are not below 69 microns). (For the avoidance of doubt, it should be noted that all particle sizes quoted herein are by volume.) Volume percentiles are measurable by laser diffraction techniques, for example by the Malvern Mastersizer.

The use of wax-coated silica as a dry-blended additive to powder coating compositions is described in co-pending GB Application 9814519.6, filed Jul. 3, 1998, and in International Application No. PCT/GB99/02109. The use of combinations of alumina and aluminum hydroxide as additives for the preparation of thin film coatings has been described in WO 94/11446. However, that application is concerned with thin film coatings formed using compositions having a high proportion of particles 50 microns or less, especially 10 microns or less in size. There is no disclosure of using a film-forming component having the above specified particle sizes. Moreover, WO 94/11446 is not concerned with matte, texture or metallic finishes or other aesthetic effects.

The composition of the present invention, however, permits the introduction of various additive components into a gloss powder coating composition to achieve special effects coatings. It allows, for example, a combination of a metallic pigment and a gloss-reducing agent or texturing agent to be incorporated simultaneously to achieve the metallic look in any gloss level and with textured finishes. The scheme provides a rapid and flexible means of manufacturing a range of powder coating compositions having different appearance characteristics.

A different scheme for the flexible production of colored powder coatings with a range of different aesthetic effects is described in EP 539385 A. According to that scheme a matting or texturing agent or other additive can be incorporated into a powder coating composition by an agglomeration technique whereby the various particulate components are fused or bonded to form composite particles. In contrast, the present invention requires that at least one aesthetics additive is dry-blended into the composition.

DETAILED DESCRIPTION OF THE INVENTION

A composition of the present invention may comprise a dry-blended fluidizable mixture of for example the following particulate components:

(I) (i) (a) a film-forming polymeric component having a d(v,50) in the range of from 25 to 50 microns or having a d(v,70) in the range of from 25 to 70 microns, or in which no more than 75%, usually no more than 70%, by volume of the particles are less than 50 microns, and
(b) as minor component(s) one or more of
(1) a gloss-reducing component,
(2) a texturing component,
(3) a metallic or mica pigment component,
(4) a coloring pigment or pigment concentrate, or
(5) a colored film-forming polymeric component compatible with the first film-forming polymeric component, in which at least 90% by volume of the particles are no more than 20 microns, or
(ii) two or more compatible film-forming polymeric components differing in coloration and each having a d(v,50) in the range of from 25 to 50 microns, or having a d(v,70) in the range of from 25 to 70 microns, or in which no more than 75%, usually no more than 70%, by volume of the particles are less than 50 microns, and optionally, as minor component(s), one or more of those specified in (b)(1) to (b)(5) above, and
(II) as a minor component, a further additive comprising wax-coated silica or consisting of alumina together with aluminum hydroxide.

Although wax-coated silica alone is contemplated as a possible further additive component, the composition may include also, for example, alumina or aluminum hydroxide, especially alumina. The combination of alumina and aluminum hydroxide should also especially be mentioned. Optionally, wax-coated silica may be used with this mixture.

Thus, for example, the further additive may be wax-coated silica, optionally together with alumina and/or aluminum hydroxide, or may be alumina together with aluminum hydroxide.

Each film-forming polymeric material comprises at least one solid film-forming resin and includes any curing agent required therefor. Usually the film-forming polymeric component(s) mentioned above are colored, and the coloring agent or agents (pigments and/or dyes), plus any curing agent, is extruded with the film-forming resin(s) so that particles formed therefrom comprise film-forming resin, coloring agent and, where applicable, curing agent.

Film-forming polymeric components I(i)(a) and I(ii) are generally powder coating compositions in their own right, having conventional particle size distribution, and being fluidizable. For example, such component(s) may comprise a powder having a size distribution up to 120 or 125 microns, generally in the range of from 10 to 120 microns (or 10 to 125 microns) in which preferably at least 90% by volume of particles are between 20 microns and 100 microns and usually no more than 75%, especially no more than 70%, are less than 50 microns. The mean particle size may be within the range of 15 to 75 microns, but generally no more than 60 microns, usually no more than 55 microns, and most often no more than 50 microns, but especially at least 20 microns, often at least 35 microns. Most commonly the powder has a d(v,99) in the range of from 60 to 120 microns. Most commonly, the mean is the range of from 25 to 50 microns, and a mean up to 45 microns should especially be mentioned. A preferred mean is in the range of from 35 to 45 microns; the corresponding d(v,99) range may be 80 to 100 microns D(v,50) values of up to 45 microns, and up to 40 microns, e.g., in the ranges 25 to 30 microns and 30 to 40 microns are also of interest; corresponding d(v,99) ranges may be 60 to 80 microns and 80 to 120 microns respectively. Such powders may have, for example, less than 12% and less than 8% of particles sub 10 microns respectively. D(v,95) values are, for example, in the range of from 60 to 120 microns. As shown above, particle size of film-forming material may be defined in a number of different ways. D(v,50) may, for example, be used for definition of particle size or, for example, the combination of d(v,50) and d(v,99) or d(v,99) on its own may be used for definition. Alternatively, the film-forming polymeric component(s) I(i)(a) and optionally I(ii) to be used according to the invention may be defined by d(v,70) and/or d(v,20) values. For example, components I(i)(a) and I(ii) may comprise a powder having a d(v,70) value in the range of from 25 to 70 microns with a preferred minimum d(v,70) value of 30 microns, more especially 40 microns, and a preferred maximum d(v,70) value of 60 microns. The d(v,20) value may be, for example, 8 to 30 microns, for example 10 to 30 microns, with a preferred minimum d(v,20) value of 15 microns, and a preferred maximum d(v,20) value of 25 microns.

These powders usually each consist of individual particles, but composite particles formed by the fusion or bonding of two or more powders of below conventional particle size are also possible. Such products are described in European Patent Nos. EP 372860-A and 539385-A. If desired also, the composition may include a component in which one or more appearance-modifying additives are fused or bonded to film-forming material to form composite particles as described in EP 539385 A, or may include two or more such components. For example, metallic or mica pigment particles may be fused or bonded to a film-forming polymeric material, preferably uncolored. Such a "masterbatch" may then be dry blended with the remaining components of the composition. Film-forming material used in a bonded agglomerate may, for example, have the particle sizes mentioned above for components I(i)(a) and I(ii) or may, for example, be of reduced particle size. Preferably, film-forming material used for bonding to an appearance-modifying additive has a d(v,50) in the range of from 15 to 50 microns (e.g., from 20 to 50 microns) or a d(v,70) in the range of from 20 to 70 microns (e.g., from 20 to 50 microns); the d(v,20) figure may, for example, be in the range of from 5 to 30 microns. Such material may have up to 100% by volume of particles less than 50 microns. A masterbatch may, for example, have a d(v,50) in the range of from 25 to 50 microns and especially a d(v,99) in the range of from 60 to 120 microns, or the particle size may be defined, for example, by a d(v,70) in the range of from 25 to 70 microns or by no more than 75%, usually no more than 70%, by volume of the particles being less than 50 microns. Masterbatch powders of different particle size, for example having a finer particle size, e.g., as mentioned above for the polymeric material within the masterbatch, should also be mentioned. Alternatively, there may be two or more film-forming materials fused or bonded to form a powder, which powder is then dry blended with the remaining components of the composition.

The present invention especially provides a powder coating composition which comprises a dry-blended mixture of the following particulate components:

a) at least one colored film-forming polymeric material
  (p1) having a d(v,50) in the range of from 25 to 50 microns and a d(v,99) in the range of from 60 to 120 microns, or
  (p2) having a d(v,70) in the range of from 25 to 70 microns and a d(v,20) in the range of from 8 to 30 microns, or
  (p3) in which no more than 75%, usually no more than 70%, by volume of the particles are less than 50 microns, and b) at least one appearance-modifying additive component selected from
  1) a gloss-reducing additive component,
  2) a texturing additive component,
  3) a metallic or mica pigment optionally bonded to uncolored film-forming polymeric material having a d(v,50) in the range of from 15 to 50 microns, or a d(v,70) in the range of from 20 to 70 microns
  4) a coloring pigment or a pigment concentrate component, or
  5) a colored film-forming polymeric component compatible with the first film-forming polymeric component, in which at least 90% by volume of the particles are no more than 20 microns,
  6) a film-forming polymeric material compatible with the film-forming component (a) and of different color therefrom, and having a particle size p1, p2 or p3 defined above, and c) a further additive selected from alumina together with aluminum hydroxide, wax-coated silica together with alumina and/or aluminum hydroxide, wax-coated silica, wherein the film-forming polymeric material, which is component (a) and, optionally, component (b6), and any film-forming polymeric material bonded to metallic or mica pigment in optional component (b3) and satisfying the criterion (p1), (p2), or (p3), together constitutes the major proportion of the composition by weight.

Preferably, in any composition of the invention the total film-forming polymeric material having a d(v,50) in the range of from 25 to 50 microns, a d(v,70) in the range of from 25 to 70 microns and/or in which no more than 75% by volume, usually no more than 70% by volume, of the particles are less than 50 microns, whether present as an individual component to be dry-blended in or present in a bonded masterbatch, constitute at least 60% by weight, especially at least 70% by weight, and often at least 80% by weight, of all film-forming polymeric material and preferably also of the total composition.

Preferably, the composition contains at least 60%, especially at least 70%, often at least 80%, by weight of colored film-forming material of such specified particle size. By using two or more differently colored compatible film-forming components of such a size (optionally with one or more of the components (b1) to (b5) a composition which gives a mixed color (speckled) effect in the final coating is obtained.

Combinations of appearance-modifying components may be of special interest. For example, the composition may include any two of components (b1), (b2) and (b3), (b3) often being in the form of a masterbatch. Using such combinations there can be obtained a matte texture finish (components (b1)+(b2)), a matte metallic finish (components (b1)+(b3)) or an antique finish (components (b2)+(b3)) in the final coating. A further useful combination is component (b2) together with pigment component (b4), which gives a contrast texture in the final coating.

The present invention also provides a kit comprising the following separate components for dry blend mixing into powder coating compositions for the preparation of powder coatings in a number of different finishes:

at least one appearance-modifying additive component selected from
  (1) a gloss-reducing component,
  (2) a texturing component,
  (3) a metallic or mica pigment component, and
  (4) a coloring pigment or pigment concentrate component, and
  (5) a colored film-forming polymeric component having a d(v,90) of no more than 20 microns, and
a further additive selected from alumina together with aluminum hydroxide, wax-coated silica together with alumina and/or aluminum hydroxide, wax-coated silica, that is:
  (i) alumina together with aluminum hydroxide
  (ii) alumina together with wax-coated silica
  (iii) aluminum hydroxide together with wax-coated silica,
  (iv) alumina together with aluminum hydroxide and wax-coated silica, or
  (v) wax-coated silica, or two or more such additives.

Preferably the kit includes all of components (1), (2) and (3) and optionally also component(s) selected from (4) and (5).

Generally, the particle size of the components is such that when added to a powder coating composition the composition remains fluidizable, although one or more components may alternatively be comminuted before use, for example together with the powder coating chip material when it is milled to powder form.

By using a kit of the present invention, the manufacturer can produce a variety of finishes quickly and easily from a finished gloss powder coating composition or from its precursor chip material or from a combination of two or more such compositions/materials by using a selection from a limited number of other components.

Where appropriate, an appearance-modifying additive component in the kit is optionally in the form of a bonded masterbatch (that is, a non-film-forming additive is bonded to film-forming polymeric material) and/or the kit includes an uncolored polymeric film-forming component having a d(v,50) in the range of from 15 to 50 microns and/or a d(v,70) in the range of from 20 to 70 microns for bonding with a non-film-forming appearance-modifying additive if desired. Thus, for example, the kit may include metallic or mica pigment and an uncolored film-forming polymeric component for optional bonding therewith or a pre-bonded metallic or mica masterbatch.

This would give, for example, the option of incorporating mica or bonded mica or mica and uncolored polymeric component into the finished powder coating composition; different effects would be achieved in the resulting coating.

The present invention has the advantage of reducing stocking levels and manufacturing capacity. It enables a very rapid and flexible service to be provided to the customer, allowing for the possibility of providing small quantities of powder coating compositions economically on request.

DESCRIPTION OF PREFERRED EMBODIMENTS

In one embodiment of the invention a film-former having a different gel time from that of the main film-former and initially compatible therewith is used to reduce gloss; for example for acid-functional polyester (component (a)), an acid-functional polyester with a different functionality and hence different gel time may be used. For polyurethane systems using hydroxy-functional polyesters cured with an isocyanate (typically isophorone diisocyanate component (a)), a hydroxy-functional polyester with a radically different functionality (e.g., a hydroxy-functional polyester with a functionality of 7 added to one with a functionality of 2) and hence a different gel time, can be used. Another possibility is to employ as gloss-reducing additive b1) a polymeric material that is per se incompatible with the polymeric film-forming material a), for example, for a polyester an acrylic polymer as appearance-modifying additive.

The gloss-reducing additive is preferably uncolored or, for example, the same color as the first component. Alternatively, it may be formulated in a color appropriate for dry blending with a number of different colors. For example, a red gloss-reducing additive could be prepared for dry blending with a range of red gloss coating compositions, a white gloss-reducing additive could be prepared for dry blending with a range of blue gloss coating compositions, etc..

In a preferred embodiment film-forming component (a) is a polyester and the gloss-reducing agent is an uncolored powder coating composition comprising a polyester of higher functionality, which composition has been milled to a fine powder. Increased amounts of this film-forming component leads to increased reduction of gloss and, in comparison with conventional gloss-reduction methods, by reducing the size of the uncolored powder higher percentages of the gloss-reducing agent can be added to the colored powder coating to reduce its gloss.

Suitably, the gloss-reducing agent is present in an amount up to 30%, preferably up to 20%, by weight, relative to the weight of the whole composition.

A gloss-reducing agent having at least 90% by volume of particles <20 microns, more especially at least 90% by volume <10 microns, and with a preferred mean particle size in the range of from 1.5 to 12 microns, for example 3 to 5 microns or 8 to 12 microns should be mentioned. Gloss-reducing agents having <90% by volume <20 microns may also be used. Advantageously the gloss-reducing agent (b1) has a particle size 90% by volume <50 microns, e.g., 90% by volume <40 microns, and with a mean particle size preferably <30 microns, advantageously in the range of from 5 to 25 microns, for example in the range of from 8 to 23 microns, e.g., substantially 18 microns. It is possible, for example, to add up to 15%, e.g., between 5 and 15%, of this reduced-size polyester additive to reduce the gloss of the colored powder coating to 70 gloss units (a satin finish) or 20 gloss units (a matte finish) from the traditional full gloss of 90 gloss units. Using a fine powder coating to modify a conventional powder coating might be expected to alter its application properties. The fine particles together with larger-sized particles would be expected to cause problems such as spitting and surging through application equipment, and the internal bi-polar charging would mean that gloss variations would occur across the coated article. The coating composition of the present invention, however, gives uniformity of product even after transportation and spraying.

If desired, a film-forming gloss-reducing additive may be bonded to a different appearance-modifying additive to form composite particles as mentioned above.

In a further embodiment conventional texturing agents may be dry blended in; those agents include the non-film-forming polymer PTFE, and CAB or other suitable film-forming polymer. The ester-modified polyester oligomer texturing agent manufactured by Troy may also be used. Such additives are known dry blend texturing additives.

Suitably, the texturing agent is present in an amount up to 5% by weight, relative to the weight of the whole composition.

In a further embodiment, aluminum and a number of other metals and alloys, e.g., stainless steel, copper, tin, bronze and brass, may be used to produce what are referred to as 'luster' or 'glamour' finishes, or 'flop', polychromatic, and sparkle effects. ('Flop' is the ability to change color when viewed at different angles. This capability is directly related to flake orientation in the film.) Mica pigments may also be used; these are thin platelets of the natural mineral mica coated with titanium dioxide and/or iron(III)oxide.

Suitably, the metallic or mica pigment is used, for example, in an amount up to 10% by weight, relative to the weight of the whole composition.

If desired, mica or a metallic pigment may be fused or bonded to powder as described for example in EP 539 385 A, preferably by mechanofusion, and then incorporated by dry blending with powder components a) and c) (and optionally other components listed under (b) above), to achieve special effects (for example, a luster or metallic sparkle not achievable by conventional means). It is often convenient for the film-forming material incorporated in the masterbatch to be uncolored. Suitably, the bonded "masterbatch" contains 2 to 40%, for example about 25%, by weight of mica or metallic pigment, and is used in an amount such that the metallic or mica pigment is present in an amount of up to 10% by weight, relative to the weight of the composition. This process is to be contrasted with the prior practice of bonding, for example, 3% of the metallic pigment to the whole batch of standard powder.

The composition may also include a coloring pigment (b4) in an amount of up to 5% by weight, relative to the weight of the whole composition. Incorporation of pigment for example together with a texturing additive gives a contrast texture finish.

Pigment may, for example, be in the form of a pigment masterbatch. Pigment masterbatches, comprising the pigment pre-dispersed in very high concentrations in polymer material which is per se non-film-forming, are generally available commercially in chip or powder form. When applied to a substrate and heated, such polymers can melt and wet out on the substrate, but the masterbatches are not formulated as film-formers and contain no curing agent.

A film-forming component compatible with the first, film-forming, component (a) and differing in coloration therefrom may also be dry blended into the composition. Usually the first film-forming component (a) is colored and any film-forming polymer component(s) are differently colored, although such a further film-forming component may alternatively be uncolored.

Such a component may, for example, be a conventional powder coating composition. With one or more film-forming components (b6) having a particle size as defined for the film-forming component (a) and different in color from component (a), a speckled finish is achieved, the result varying according to the relative amounts of the film-forming components. Components (a) and, if present, (b6) preferably constitute at least 60%, especially at least 70%, often at least 80%, by weight of the composition.

Pigment component (b4) or additional film-forming component (b5) compatible with the first film-forming component (a) may alternatively be used for color tinting, for example of an uncolored powder coating composition (a) or, especially if the additional component is close in color to the film-forming component (a), for color adjustment of that composition. In each case, if the amount and particle size of this additional component are sufficiently small the differences in color arising from differently colored particles in the final coating cannot be discerned by the unaided human eye and a visually homogeneous coating will result. For such purposes the component is generally added in an amount of up to 5%, preferably up to 1%, by weight, based on the weight of the total composition; suitably the component has a particle size such that least 90% by volume of particles are below 20 microns, preferably below 10 microns, and the mean particle size is within the range of from 1.5 to 12 microns. The possibility of adjusting color by this means also assists product flexibility.

Thus, non-film-forming appearance-modifying additives (present as separate particulate components or in a bonded masterbatch powder component) may be, for example, a texturing agent (if present, generally 0.5% by weight or more of the composition), a metallic or mica pigment (if present, generally 0.1% by weight or more of the composition) and/or pigment or pigment concentrate (if present, generally 0.01% by weight or more of the composition).

Film-forming appearance-modifying additives (present as separate particulate components or in a bonded masterbatch powder component) may be, for example, a gloss-reducing film-forming additive (if present, generally 0.5% by weight or more of the composition) and/or a colored film-forming polymeric component compatible with film-forming component (a) (if present, generally 0.01% by weight or more of the composition).

As further particulate component (c) the following combinations should be mentioned:
i) alumina together with aluminum hydroxide
ii) alumina together with wax-coated silica
iii) alumina together with aluminum hydroxide and wax-coated silica
iv) aluminum hydroxide together with wax-coated silica
v) wax-coated silica.

The combinations (i), (ii) and (iii) should especially be mentioned. The combinations of alumina pre-mixed with aluminum hydroxide, alumina with aluminum hydroxide, and wax-coated silica in particular have given good results.

The term "coating" as used herein in relation to silicas for use according to the invention includes impregnation of porous silica materials, and the expression "coated silica" is to be understood accordingly.

The term "silica" as used herein includes materials obtained by pyrogenic and, preferably, wet processes leading to precipitated silicas or silica gels, as well as, in principle, mixed metal-silicon oxides and naturally-occurring materials such as, for example, diatomaceous earth. Silicas for use according to the invention will in general have an amorphous structure. The term "silica" includes silicic acid materials. Silicates also come into consideration.

A preferred material comprises micronized silica gel.

The term "wax" as used herein includes: natural animal waxes (for example, beeswax, lanolin); natural vegetable waxes (for example, carnauba wax); natural petroleum waxes (for example, paraffin wax, microcrystalline wax); and synthetic waxes (for example, ethylenic polymers and polyol ether-esters). Mineral waxes other than petroleum waxes may also come into consideration.

An important group of waxes for use in accordance with the invention comprises esters of long-chain aliphatic alcohols (typically $C_{16}$ and above) with long-chain fatty acids (typically $C_{16}$ and above). Such esters and acids are preferably straight-chain compounds, and may be saturated or unsaturated. Examples of acids which may be used include stearic acid, palmitic acid and oleic acid and mixtures of two or more thereof.

Waxes derived from long-chain aliphatic compounds as described above may include hydrocarbons.

In addition to esters of the long-chain acids as described above there may be mentioned salts such as, for example, aluminum stearate.

Preferred wax materials for use in accordance with the invention are materials which have good compatibility with the polymer component(s) of the powder coating composition, that is to say, materials which can be mixed homogeneously with the polymers without significant phase separation. It will be found that some wax materials (for example, halogenated waxes) are in general not compatible in this sense with the powder coating polymer(s). The use of such materials would be expected to give rise to defects in the surface appearance of the finished applied coating, and is accordingly not recommended.

Wax-coated silicas suitable for use in accordance with the invention include commercially available materials such as, for example, GASIL 937 from Crosfield (a silica gel coated with microcrystalline paraffin wax) and OK 607 from Degussa (a similar material with a coating which also includes a short-chain ($C_6$) saturated amine or alkyl ammonium component).

Coating of the silica material may be effected by methods known in the art, for example, by co-milling of the silica with a solid wax material, or by admixing the silica material with a wax material dissolved in a suitable solvent which is then evaporated.

The amount of wax coated onto the silica may, for example, be in the range of from 2 to 10% by weight, based on the weight of the silica.

Further information concerning wax-coated silicas for use in accordance with the invention may be found in U.S. Pat. Nos. 3,607,337 and 3,816,154, and in WO97/08250.

In addition to wax-coated silica, a powder coating composition of the invention may incorporate, also by dry blending, aluminum oxide and/or aluminum hydroxide, preferably aluminum oxide or aluminum oxide and aluminum hydroxide. Aluminum oxy-hydroxide may be used in addition to or instead of aluminum hydroxide.

Alternatively, a combination of aluminum oxide and aluminum hydroxide alone may be used.

It is believed that any of the main structural types of these materials may be used, that is to say:

| | |
|---|---|
| $\alpha$ - $Al_2O_3$ | Corundum |
| $\alpha$ - $Al(OH)_3$ | Bayerite |
| $\gamma$ - $Al_2O_3$ | |
| $\gamma$ - $Al(OH)_3$ | Gibbsite |

Preference may be given to $\gamma$ structural types.

The total content of the further component (c) incorporated in a powder coating composition of the invention may in general be up to 5% by weight, and generally at least 0.002%, usually at least 0.05%, by weight, e.g., in the range of from 0.1 to 5% by weight, based on the total weight of the composition, and advantageously up to 2% by weight, especially up to 1.5% by weight, and preferably at least 0.2% by weight, and more especially 0.3 to 1% by weight. Special mention should be made of compositions in which there is a total content of no more than 10% by weight of non-film-forming material present as separate component(s) and (in the case of appearance-modifying additives) optionally bonded in masterbatch component(s).

The proportion of wax-coated silica incorporated in a powder coating composition of the invention may in general be in the range of from 0.002 to 2.0% by weight, based on the total weight of the composition, advantageously from 0.02 to 1.5% by weight and preferably from 0.04 to 1.0% by weight, more especially at least 0.2% by weight, especially 0.3 to 0.7% by weight, for example, 0.3 to 0.5% by weight.

In the case in which one of the dry-blended additives is alumina, the proportion of alumina incorporated may be at least 0.01% by weight, advantageously at least 0.02% by weight and generally in the range of from 0.2 to 0.4% by weight based on the total composition. Because of its relatively intense effect on electrostatic phenomena, the proportion of alumina will not normally exceed 1.0% by weight.

Typically, in the case in which the component is alumina together with aluminum hydroxide, the content of the aluminum hydroxide will not exceed 5% based on the total composition, and will in general not exceed 3% based on the total composition, and in the preferred case will not exceed 1%. Ratios of alumina to aluminum hydroxide, from 90:10 to 10:90, e.g., 12:88 to 45:55, should especially be mentioned.

In the case in which the powder coating composition includes dry-blended additives comprising wax-coated silica and aluminum oxide, the relative proportions of silica to aluminum oxide may in general be in the range of from 99:1 to 1:99, advantageously from 80:20 to 20:80, and preferably 70:30 to 30:70, for example 50:50.

In the case in which the dry-blended additives comprise wax-coated silica and aluminum hydroxide, the relative proportions of silica to the aluminum hydroxide may in general be from 99:1 to 30:70, advantageously from 90:10 to 40:60, preferably from 80:20 to 50:50, for example 65:35.

In the case in which the dry-blended additives comprise wax-coated silica, aluminum oxide and aluminum hydroxide, the relative proportions of the additives may in general be as follows:

|  | SiO$_2$ | Al$_2$O$_3$ | Al(OH)$_3$ |
| --- | --- | --- | --- |
|  | 1 to 98% | 1 to 98% | 1 to 70% |
| advantageously | 5 to 50% | 10 to 90% | 1 to 60% |
| preferably | 10 to 30% | 20 to 85% | 1 to 55% |

Each dry-blended additive (c) is generally in finely divided form and may have a particle size up to 5 microns, or even up to 10 microns in some cases. Preferably, however, the particle size is not greater than 2 microns, and is more especially not greater than 1 micron.

When component (c) comprises two or more products it is strongly preferred for at least this component to be pre-mixed, preferably intimately and homogeneously by a high shear technique, before being dry-blended with the composition. The case where component (c) includes wax-coated silica, and that material is incorporated and dry-blended separately, should also be mentioned.

As already mentioned, a powder coating composition according to the invention may contain a single film-forming powder component comprising one or more film-forming resins or may comprise a mixture of two or more such components, a component optionally being in the form of a masterbatch in which film-forming material is bonded to non-film forming material.

The film-forming resin (polymer) acts as a binder, having the capability of wetting pigments and providing cohesive strength between pigment particles and of wetting or binding to the substrate, and melts and flows in the curing/stoving process after application to the substrate to form a homogeneous film.

Each film-forming powder coating component of a composition of the invention will in general be a thermosetting system, although thermoplastic systems (based, for example, on polyamides) can in principle be used instead.

When a thermosetting resin is used, the solid polymeric binder system generally includes a solid curing agent for the thermosetting resin; alternatively two co-reactive film-forming thermosetting resins may be used.

The film-forming polymer used in the manufacture of a film-forming component of a thermosetting powder coating composition according to the invention may be one or more selected from carboxy-functional polyester resins, hydroxy-functional polyester resins, epoxy resins, and functional acrylic resins.

A film-forming component of the composition can, for example, be based on a solid polymeric binder system comprising a carboxy-functional polyester film-forming resin used with a polyepoxide curing agent. Such carboxy-functional polyester systems are currently the most widely used powder coatings materials. The polyester generally has an acid value in the range 10–100, a number average molecular weight Mn of 1,500 to 10,000 and a glass transition temperature T$_g$ of from 30° C. to 85° C., preferably at least 40° C. The polyepoxide can, for example, be a low molecular weight epoxy compound such as triglycidyl isocyanurate (TGIC), a compound such as diglycidyl terephthalate condensed glycidyl ether of bisphenol A or a light-stable epoxy resin. Such a carboxy-functional polyester film-forming resin can alternatively be used with a bis(beta-hydroxyalkylamide) curing agent such as tetrakis(2-hydroxyethyl) adipamide.

Alternatively, a hydroxy-functional polyester can be used with a blocked isocyanate-functional curing agent or an amine-formaldehyde condensate such as, for example, a melamine resin, a urea-formaldehyde resin, or a glycol ural formaldehyde resin, for example the material "Powderlink 1174" supplied by the Cyanamid Company, or hexahydroxymethyl melamine. A blocked isocyanate curing agent for a hydroxy-functional polyester may, for example, be internally blocked, such as the uret dione type, or may be of the caprolactam-blocked type, for example isophorone diisocyanate.

As a further possibility, an epoxy resin can be used with an amine-functional curing agent such as, for example, dicyandiamide. Instead of an amine-functional curing agent for an epoxy resin, a phenolic material may be used, preferably a material formed by reaction of epichlorohydrin with an excess of bisphenol A (that is to say, a polyphenol made by adducting bisphenol A and an epoxy resin). A functional acrylic resin, for example a carboxy-, hydroxy- or epoxy-functional resin can be used with an appropriate curing agent.

Mixtures of film-forming polymers can be used, for example a carboxy-functional polyester can be used with a carboxy-functional acrylic resin and a curing agent such as a bis(beta-hydroxyalkylamide) which serves to cure both polymers. As further possibilities, for mixed binder systems, a carboxy-, hydroxy- or epoxy-functional acrylic resin may be used with an epoxy resin or a polyester resin (carboxy-or hydroxy-functional). Such resin combinations may be selected so as to be co-curing, for example a carboxy-functional acrylic resin co-cured with an epoxy resin, or a carboxy-functional polyester co-cured with a glycidyl-functional acrylic resin. More usually, however, such mixed binder systems are formulated so as to be cured with a single curing agent (for example, use of a blocked isocyanate to cure a hydroxy-functional acrylic resin and a hydroxy-functional polyester). Another preferred formulation involves the use of a different curing agent for each binder of a mixture of two polymeric binders (for example, an amine-cured epoxy resin used in conjunction with a blocked isocyanate-cured hydroxy-functional acrylic resin).

Other film-forming polymers which may be mentioned include functional fluoropolymers, functional fluorochloropolymers and functional fluoroacrylic polymers, each of which may be hydroxy-functional or carboxy-functional, and may be used as the sole film-forming polymer or in conjunction with one or more functional acrylic, polyester and/or epoxy resins, with appropriate curing agents for the functional polymers.

Other curing agents which may be mentioned include epoxy phenol novolacs and epoxy cresol novolacs; isocyanate curing agents blocked with oximes, such as isophorone diisocyanate blocked with methyl ethyl ketoxime, tetramethylene xylene diisocyanate blocked with acetone oxime, and Desmodur W (dicyclohexylmethane diisocyanate curing agent) blocked with methyl ethyl ketoxime; light-stable epoxy resins such as "Santolink LSE 120" supplied by Monsanto; and alicyclic poly-epoxides such as "EHPE-3150" supplied by Daicel.

Examples of pigments which may be used are inorganic pigments, such as, for example, titanium dioxide white, red and yellow iron oxides, chrome pigments and carbon black, and organic pigments such as, for example, phthalocyanine, azo, anthraquinone, thioindigo, isodibenzanthrone, triphendioxane, and quinacridone pigments, vat dye pigments and lakes of acid, basic and mordant dyestuffs. Dyes may be used instead of or as well as pigments. Each colored film-forming component of the coating composition may contain a single colorant (pigment or dye) or may contain more than one colorant.

The composition of the invention may also include one or more extenders or fillers, which may be used inter alia to assist opacity, while minimizing costs, or more generally as a diluent. The following ranges should be mentioned for the total pigment/filler/extender content of the film-forming polymeric material (e.g., (a) or (b6)): 0% to 55% by weight, 0% to 50% by weight, 10% to 50% by weight, 0% to 45% by weight, and 25% to 45% by weight. Of the total pigment/filler/extender content, a pigment content of $\leq 40\%$ by weight of the film-forming polymeric material may be used. Usually a pigment content of 25–30% is used, although in the case of dark colors opacity can be obtained with <10% by weight of pigment.

The powder coating composition may also contain one or more performance additives such as, for example, a flow-promoting agent, a plasticiser, a stabilizer, for example a stabilizer against UV degradation, or an anti-gassing agent, such as benzoin. Such additives are known and standard additives for use in powder coating compositions. The following ranges should be mentioned for the total performance additive content of a film-forming polymeric material: 0% to 5% by weight, 0% to 3% by weight, and 1% to 2% by weight.

In general, these coloring agents and performance additives will be incorporated into the film-forming material before and/or during the extrusion or other homogenization process, and not by dry blending. The film-forming component(s) may be manufactured by a conventional melt extrusion and micronizing process, optionally followed by a fusion or bonding process as described in EP 539385A. Thus, for example, two or more separate powders may be formed by extrusion and micronizing and then fused or bonded into composite particles. In a different embodiment, melt extrusion and micronizing may be followed by fusion or bonding to a non-film-forming additive to form an appearance-modifying component (b).

The additive components of the invention (components (b) and (c)) may be incorporated in the powder coating composition by any available dry-blending method, for example: (a) injection at the mill, with the chip and additive (s) fed into the mill simultaneously; (b) introduction at the stage of sieving after milling; and (c) post-production blending in a "tumbler" or other suitable mixing device. In one embodiment, components (a) and (b) are mixed together and a pre-mixed component (c) is then added before discharge from the mixer.

Thus in one embodiment of the present invention, a range of basic colored powder coating compositions is produced, conventionally, in a conventional melt extrusion step, and a wide range of different finishes can then be produced easily on demand by a simple mixing step, so that the production of small quantities becomes commercially feasible.

The gloss-reducing component may, for example, be a pre-prepared uncolored coating composition of fine particle size or one of conventional size which is reduced in size just prior to use. Advantageously, for any particular type of film-forming chemistry (e.g., acid-functional polyester, hydroxy-functional polyester), the kit of the invention includes a "universal" gloss-reducing component suitable for all conventional powder coating compositions of that chemistry. Other appearance-modifying additives may be for example commercially available additives or prepared therefrom by a bonding process as in the case of the metallic or mica masterbatch discussed above.

A powder coating composition according to the invention may in principle be applied to a substrate by any suitable process of powder coating technology, for example by electrostatic spray coating, or by fluidized-bed or electrostatic fluidized-bed processes.

After application of the powder coating composition to a substrate, conversion of the resulting adherent particles into a continuous coating (including, where appropriate, curing of the applied composition) may be effected by heat treatment and/or by radiant energy, notably infra-red, ultra-violet or electron beam radiation.

The powder is usually cured on the substrate by the application of heat (the process of stoving), usually for a period of from 5 to 30 minutes and usually at a temperature in the range of from 150 to 220° C., although temperatures down to 90° C. may be used for some resins, especially epoxy resins; the powder particles melt and flow and a film is formed. The curing times and temperatures are interdependent in accordance with the composition formulation that is used, and the following typical ranges may be mentioned:

| Temperature (° C.) | Time |
|---|---|
| 280 to 100* | 10 secs. to 40 mins. |
| 250 to 150 | 15 secs. to 30 mins. |
| 220 to 160 | 5 mins. to 20 mins. |

*Temperature down to 90° C. may be used for some resins, especially certain epoxy resins.

The invention also provides a process for forming a coating on a substrate, which comprises applying a composition according to the invention to a substrate, for example by an electrostatic spray coating process, and heating the applied composition to melt and fuse the particles and cure the coating.

The film may be any suitable thickness. For decorative finishes, film thicknesses as low as 20 microns should be mentioned, but it is more usual for the film thickness to fall within the range 25–120 microns, with common ranges being 30–80 microns for some applications, and 60–120 microns or, more preferably, 60–100 microns for other applications, while film thicknesses of 80–150 microns are less common, but not rare.

The substrate may comprise a metal, a heat-stable plastics material, wood, glass, or a ceramic or textile material. Advantageously, a metal substrate is chemically or mechanically cleaned prior to application of the composition, and is preferably subjected to chemical pre-treatment, for example with iron phosphate, zinc phosphate or chromate. Substrates other than metallic are in general preheated prior to application or, in the case of electrostatic spray application, are pretreated with a material that will aid such application.

The following Examples illustrate the invention:

EXAMPLES

The aluminum oxide used in the Examples was Aluminum Oxide C, from Degussa, mean particle size <0.2 microns; the aluminum hydroxide used was Martinal OL 103C, from Omya Crofton & Garry, mean particle size 0.8 microns; and the wax-coated silica used was GASIL 937, from Crosfield, mean particle size 6.5 microns (a micronized silica gel coated with microcrystalline paraffin wax).

The particle size distribution data reported in the Examples was obtained using the Mastersizer X laser light-scattering device from Malvern Instruments.

Individual components used in the Examples were prepared as follows:

| Blue Polyester Gloss Base Composition | |
|---|---|
| Phthalocyanine Blue Pigment | 18 g |
| Black Iron Oxide Pigment | 8 g |
| Titanium Dioxide | 17 g |
| Filler (Barium Sulphate) | 100 g |
| Filler (Calcium Carbonate) | 200 g |
| Carboxylic Acid-Functional Polyester Resin (AV = 34 mg KOH/g) | 618 g |
| Hydroxyalkylamide Curing Agent (i.e., PRIMID, from EMS Grilon) | 23 g |
| Acrylic Flow Modifier | 8 g |
| Benzoin | 4 g |
| Polyethylene Wax | 4 g |

The ingredients were dry mixed in a blender and extruded at 120° C. The extrudate was then impact milled and sieved to produce a powder with a particle size distribution of $d(v,20)=20$ microns, $d(v,50)=38$ microns, $d(v,70)=52$ microns, $d(v,95)=79$ microns, $d(v,99)=94$ microns; 68% of particles were less than 50 µm.

| White Polyester Gloss Base Composition | |
|---|---|
| Titanium Dioxide | 300 g |
| Filler (Barium Sulphate) | 100 g |
| Filler (Calcium Carbonate) | 70 g |
| Carboxylic Acid-Functional Polyester Resin (AV = 34 mg KOH/g) | 756 g |
| Hydroxyalkylamide Curing Agent | 28 g |
| Acrylic Flow Modifier | 8 g |
| Benzoin | 4 g |
| Polyethylene Wax | 4 g |

The ingredients were dry mixed in a blender and extruded at 120° C. The extrudate was then impact milled and sieved to produce a powder with a particle size distribution of $d(v,20)=22$ microns, $d(v,50)=40$ microns, $d(v,70)=52$ microns, $d(v,95)=78$ microns, $d(v,99)=99$ microns; and 64%<50 microns.

| Yellow Polyester Gloss Base Composition | |
|---|---|
| Titanium Dioxide | 164 g |
| Yellow Iron Oxide Pigment | 7 g |
| Yellow Quinopthalone Pigment | 29 g |
| Filler (Calcium Carbonate) | 140 g |
| Carboxylic Acid-Functional Polyester Resin (AV = 34 mg KOH/g) | 621 g |
| Hydroxyalkylamide Curing Agent | 23 g |
| Acrylic Flow Modifier | 8 g |
| Benzoin | 4 g |
| Polyethylene Wax | 4 g |

The ingredients were dry mixed in a blender and extruded at 120° C. The extrudate was then impact milled and sieved to produce a powder with a particle size distribution of $d(v,20)=20$ microns, $d(v,50)=40$ microns, $d(v,70)=51$ microns, $d(v,95)=82$ microns, $d(v,99)=102$ microns; and 63%<50 microns.

| Grey Polyester Gloss Base Composition | |
|---|---|
| Carbon Black Pigment | 9 g |
| Titanium Dioxide | 76 g |
| Yellow Iron Oxide Pigment | 15 g |

-continued

| Grey Polyester Gloss Base Composition | |
|---|---|
| Filler (Barium Sulphate) | 210 g |
| Filler (Calcium Carbonate) | 100 g |
| Carboxylic Acid-Functional Polyester Resin (AV = 34 mg KOH/g) | 561 g |
| Hydroxyalkylamide Curing Agent | 21 g |
| Benzoin | 4 g |
| Polyethylene Wax | 4 g |

The ingredients were dry mixed in a blender and extruded at 120° C. The extrudate was then impact milled and sieved to produce a powder with a particle size distribution of $d(v,20)=19$ microns, $d(v,50)=40$ microns, $d(v,70)=51$ microns, $d(v,95)=80$ microns, $d(v,99)=97$ microns; and 67%<50 microns.

| Brown Polyester Gloss Base Composition | |
|---|---|
| Carbon Black Pigment | 3 g |
| Titanium Dioxide | 4 g |
| Yellow Iron Oxide Pigment | 44 g |
| Red Iron Oxide Pigment | 9 g |
| Filler (Barium Sulphate) | 170 g |
| Filler (Calcium Carbonate) | 120 g |
| Carboxylic Acid-Functional Polyester Resin (AV = 34 mg KOH/g) | 619 g |
| Hydroxyalkylamide Curing Agent | 23 g |
| Benzoin | 4 g |
| Polyethylene Wax | 4 g |

The ingredients were dry mixed in a blender and extruded at 120° C. The extrudate was then impact milled and sieved to produce a powder with a particle size distribution of $d(v,20)=22$ microns, $d(v,50)=42$ microns, $d(v,70)=52$ microns, $d(v,95)=84$ microns, $d(v,99)=106$ microns; and 62%<50 microns.

| Clear Polyester Gloss Base Composition | |
|---|---|
| Carboxylic Acid-Functional Polyester Resin (AV = 35 mg KOH/g) | 920 g |
| TGIC Curing Agent | 60 g |
| Amide modified Polyester Oligomer Flow Aid | 13 g |
| Phenolic Antioxidant | 6 g |
| Benzoin | 1 g |

The ingredients were dry mixed in a blender and extruded at 120° C. The extrudate was then impact milled and sieved to produce a powder with a particle size distribution of $d(v,20)=19$ microns, $d(v,50)=40$ microns, $d(v,70)=50$ microns, $d(v,95)=80$ microns, $d(v,99)=97$ microns; and 68%<50 microns.

| Red Polyester-Epoxy Hybrid Gloss Base Composition | |
|---|---|
| Titanium Dioxide | 10 g |
| Bonarylamide Red Pigment | 68 g |
| Filler (Barium Sulphate) | 52 g |
| Filler (Calcium Carbonate) | 52 g |
| Carboxylic Acid-Functional Polyester Resin (AV = 34 mg KOH/g) | 605 g |
| Epoxy Resin Curing Agent (EEW = 610 g/mol) | 247 g |
| Tetrabutylammonium Bromide Catalyst | 2 g |
| Acrylic Flow Modifier | 10 g |
| Benzoin | 3 g |
| Polyethylene Wax | 3 g |

The ingredients were dry mixed in a blender and extruded at 110° C. The extrudate was then impact milled and sieved to produce a powder with a particle size distribution of $d(v,20)=20$ microns, $d(v,50)=40$ microns, $d(v,70)=52$ microns, $d(v,95)=81$ microns, $d(v,99)=98$ microns; and 68%<50 microns.

| White Epoxy Gloss Base Composition | |
| --- | --- |
| Titanium Dioxide | 295 g |
| Epoxy-Functional Polymer (EEW = 530 g/mol) | 657 g |
| Dicyandiamide Crosslinker | 32 g |
| Amino Phenolic Catalyst | 4 g |
| Acrylic Flow Modifier | 10 g |
| Benzoin | 2 g |

The ingredients were dry mixed in a blender and extruded at 110° C. The extrudate was then impact milled and sieved to produce a powder with a particle size distribution of $d(v,20)=20$ microns, $d(v,50)=39$ microns, $d(v,70)=52$ microns, $d(v,95)=80$ microns, $d(v,99)=96$ microns; and 66%<50 microns.

Blue Polyester Colorant Additive Composition

The blue polyester gloss base composition described above was further milled and sieved to produce a powder with a particle size distribution of $d(v,50)=5$ microns, $d(v,90)=12$ microns, $d(v,99)=13$ microns.

White Polyester Colorant Additive Composition

The white polyester gloss base composition described above was further milled and sieved to produce a powder with a particle size distribution of $d(v,50)=5$ microns, $d(v,90)=12$ microns, $d(v,99)=13$ microns.

Agglomerated Blue Polyester Gloss Base Composition

Equal proportions of the blue and white polyester colorant additive compositions described above were blended together in a Henschel FM10 mixture for 30 minutes in total, with a water jacket taking the temperature to 54° C. The agglomerated powder was sieved to produce a powder having a particle size distribution of $d(v,20)=10$ microns, $d(v,50)=16$ microns, $d(v,70)=25$ microns.

| Polyester Matting Base Composition 1 | |
| --- | --- |
| Carboxylic Acid-Functional Polyester Resin (AV = 80 mg KOH/g) | 575 g |
| Hydroxyalkylamide Curing Agent | 65 g |
| Phenolic Antioxidant | 2 g |
| Benzoin | 4 g |
| Acrylic Flow Modifier | 16 g |
| Filler (Barium Sulphate) | 325 g |
| Amide-modified Castor Oil Wax Rheological Agent | 10 g |
| Polyethylene Wax | 2 g |

The ingredients were dry mixed in a blender and extruded at 120° C. The extrudate was then impact milled and sieved to produce a powder with a particle size distribution of $d(v,20)=5$ microns, $d(v,50)=11$ microns, $d(v,70)=15$ microns, $d(v,95)=28$ microns, $d(v,99)=35$ microns; and 100%<50 microns.

Polyester Matting Base Composition 2

The ingredients for polyester matting base composition 1 were dry mixed in a blender and extruded at 120° C. The extrudate was then impact milled and sieved to produce a powder with a particle size distribution of $d(v,20)=10$ microns, $d(v,50)=20$ microns, $d(v,70)=27$ microns, $d(v,95)=48$ microns, $d(v,99)=62$ microns; and 96%<50 microns.

| Clear Polyester Gloss Mica Masterbatch Composition | |
| --- | --- |
| Clear Polyester Gloss Base (see above) | 750 g |
| Mica Pigment | 250 g |

The ingredients were fused together by use of a high speed Henschel mixer for 9 minutes at 1000 r.p.m. until a temperature of 70° C. was reached inside the mixer. The mix was then left to cool to room temperature then discharged and sieved to produce a powder with a particle size distribution of $d(v,20)=19$ microns, $d(v,50)=40$ microns, $d(v,70)=51$ microns, $d(v,95)=79$ microns, $d(v,99)=97$ microns; and 68%<50 microns.

| Dry Blend Additive 1 | |
| --- | --- |
| Aluminum Oxide | 6 g |
| Aluminum Hydroxide | 24 g |

The ingredients were charged to a Moulinex II high-shear blender, mixed for 30 seconds, cooled and the mixing and cooling procedure repeated twice more to give a total of three operations.

| Dry Blend Additive 2 | |
| --- | --- |
| Aluminum Oxide | 13.5 g |
| Aluminum Hydroxide | 16.5 g |

The ingredients were charged to a Moulinex II high-shear blender, mixed for 30 seconds, cooled and the mixing and cooling procedure repeated twice more to give a total of three operations.

| Dry Blend Additive 3 | |
| --- | --- |
| Aluminum Oxide | 24 g |
| Aluminum Hydroxide | 6 g |

The ingredients were charged to a Moulinex II high-shear blender, mixed for 30 seconds, cooled and the mixing and cooling procedure repeated twice more to give a total of three operations.

| Dry Blend Additive 4 | |
| --- | --- |
| Aluminum Oxide | 19.2 g |
| Aluminum Hydroxide | 4.8 g |
| Wax-coated Silica | 6.0 g |

The ingredients were charged to a Moulinex II high-shear blender, mixed for 30 seconds, cooled and the mixing and cooling procedure repeated twice more to give a total of three operations.

| Dry Blend Additive 5 | |
|---|---|
| Aluminum Oxide | 10 g |
| Wax-coated Silica | 10 g |

The ingredients were charged to a Moulinex II high-shear blender, mixed for 30 seconds, cooled and the mixing and cooling procedure repeated twice more to give a total of three operations.

| Dry Blend Additive 6 | |
|---|---|
| Aluminum Hydroxide | 7 g |
| Wax-coated Silica | 13 g |

The ingredients were charged to a Moulinex II high-shear blender, mixed for 30 seconds, cooled and the mixing and cooling procedure repeated twice more to give a total of three operations.

| Dry Blend Additive 7 |
|---|
| Wax-coated Silica |

| Example 1: Blue Polyester Matte Composition | |
|---|---|
| Blue Polyester Gloss Base | 865 g |
| Polyester Matting Base 1 | 130 g |
| Dry Blend Additive 1 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a matte finish was obtained. No variation in film appearance was observed over the range of conditions.

| Example 2: Yellow Polyester Matte Composition | |
|---|---|
| Yellow Polyester Gloss Base | 867.8 g |
| Polyester Matting Base 2 | 129.7 g |
| Dry Blend Additive 3 | 2.5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a matte finish was obtained. No variation in film appearance was observed over the range of conditions.

| Example 3: Blue Polyester Satin Composition | |
|---|---|
| Blue Polyester Gloss Base | 947.6 g |
| Polyester Matting Base 1 | 47.4 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG I gun) onto aluminum panels to a film thickness of 50–110 microns and stoved at 200° C. for 15 minutes. A coating with a satin finish was obtained. No variation in film appearance was observed over the range of conditions.

| Example 4: Grey Polyester Texture Composition | |
|---|---|
| Grey Polyester Gloss Base | 975 g |
| Ester-Modified Polyether Oligomer Texturing Additive (Troy Powdermate 508TEX) | 20 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a textured finish was obtained. No variation in film appearance was observed over the range of conditions.

| Example 5: Grey Polyester Fine Texture Composition | |
|---|---|
| Grey Polyester Gloss Base | 965 g |
| PTFE Texturing Additive (Hoechst Hostaflon TF1702) | 30 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a fine textured finish was obtained. No variation in film appearance was observed over the range of conditions.

| Example 6: Grey Polyester Coarse Texture Composition | |
|---|---|
| Grey Polyester Gloss Base | 985 g |
| CAB Texturing Additive (Eastman Chemical CAB 551-0.2) | 10 g |
| Dry Blend Additive 2 | 5 g |

The ingredients were dry blended by use of a Waring Laboratory high shear blender and mixed for two 5 second periods. When the powder mixture was sprayed at an application voltage of —SO to −100 kV (Ransberg Gema PG 1 gun) onto aluminum panels to a film thickness of 50–110 microns and stoved at 200° C. for 15 minutes, a coating with a coarse textured finish was obtained. No variation in film appearance was observed over the range of conditions.

| Example 7: Brown Polyester Coarse Texture Composition | |
| --- | --- |
| Brown Polyester Gloss Base | 991 g |
| Flow Aid (DSM Uralac P6188) micronized to d(v,50) = 40 microns | 4 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a coarse textured finish was obtained. No variation in film appearance was observed over the range of conditions.

| Example 8: Grey Polyester Contrast Texture Composition | |
| --- | --- |
| Grey Polyester Gloss Base | 982 g |
| CAB Texturing Additive (Eastman Chemical CAB 551-0.2) | 10 g |
| Titanium Dioxide | 2 g |
| Red Iron Oxide Pigment | 1 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a contrast textured finish (light grey with dark grey peaks appearing as an exaggerated sparkle) was obtained. No variation in film appearance was observed over the range of conditions.

| Example 9: Blue Polyester Matte Texture Composition | |
| --- | --- |
| Blue Polyester Gloss Base | 845 g |
| Polyester Matting Base 1 | 130 g |
| Ester-Modified Polyether Oligomer Texturing Additive (Troy Powdermate 508TEX) | 20 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a matte textured finish was obtained. No variation in film appearance was observed over the range of conditions.

| Example 10: Blue Polyester Metallic Composition | |
| --- | --- |
| Blue Polyester Gloss Base | 965 g |
| Mica Pigment | 30 g |
| Dry Blend Additive 4 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a metallic finish was obtained. No variation in film appearance was observed over the range of conditions.

| Example 11: Blue Polyester Metallic Sparkle Composition | |
| --- | --- |
| Blue Polyester Gloss Base | 900 g |
| Clear Polyester Gloss Mica Masterbatch | 100 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a metallic sparkle finish was obtained. No variation in film appearance was observed over the range of conditions.

| Example 12: Blue Polyester Matte Metallic Composition | |
| --- | --- |
| Blue Polyester Gloss Base | 840 g |
| Polyester Matting Base 1 | 125 g |
| Mica Pigment | 30 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a matte metallic finish was obtained. No variation in film appearance was observed over the range of conditions.

| Example 13: Brown Polyester Antique Composition | |
| --- | --- |
| Brown Polyester Gloss Base | 945 g |
| Ester-Modified Polyether Oligomer Texturing additive (Troy Powdermate 508TEX) | 20 g |
| Mica Pigment | 30 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with an antique finish was obtained. No variation in film appearance was observed over the range of conditions.

| Example 14: Polyester Mixed Color Composition | |
| --- | --- |
| Blue Polyester Gloss Base | 497.5 g |
| White Polyester Gloss Base | 497.5 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a mixed (speckled) color finish was obtained. No variation in film appearance was observed over the range of conditions.

| Example 15: White Epoxy Texture Composition | |
|---|---|
| White Epoxy Gloss Base | 975 g |
| Ester-Modified Polyether Oligomer Texturing Additive (Troy Powdermate 508TEX) | 20 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto aluminum panels to a film thickness of 50–110 microns and stoved at 200° C. for 15 minutes, a coating with a textured finish was obtained. No variation in film appearance was observed over the range of conditions.

| Example 16: Red Hybrid Metallic Composition | |
|---|---|
| Red Hybrid Gloss Base | 965 g |
| Mica Pigment | 30 g |
| Dry Blend Additive 2 | 5 g |

The ingredients were dry blended by use of a Waring Laboratory high shear blender and mixed for two 5 second periods. When the powder mixture was sprayed at an application voltage of −50 to −100 kv (Ransberg Gema PG 1 gun) onto Aluminum panels to a film thickness of 50–110 microns and stoved at 200° C. for 15 minutes, a coating with a metallic finish was obtained. No variation in film appearance was observed over the range of conditions.

| Example 17: Blue Polyester Matte Composition | |
|---|---|
| Blue Polyester Gloss Base | 867 g |
| Polyester Matting Base 1 | 130 g |
| Dry Blend Additive 5 | 3 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto Aluminum panels to a film thickness of 50–110 microns and stoved at 200° C. for 15 minutes, a coating with a matte finish was obtained. No variation in film appearance was observed over the range of conditions.

| Example 18: Blue Polyester Satin Composition | |
|---|---|
| Blue Polyester Gloss Base | 948 g |
| Polyester Matting Base 1 | 47 g |
| Dry Blend Additive 6 | 5 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto Aluminum panels to a film thickness of 50–110 microns and stoved at 200° C. for 15 minutes, a coating with a satin finish was obtained. No variation in film appearance was observed over the range of conditions.

| Example 19: Yellow Polyester Matte Composition | |
|---|---|
| Yellow Polyester Gloss Base | 867 g |
| Polyester Matting Base 1 | 130 g |
| Dry Blend Additive 7 | 3 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto Aluminum panels to a film thickness of 50–110 microns and stoved at 200° C. for 15 minutes, a coating with a matte finish was obtained. No variation in film appearance was observed over the range of conditions.

| Example 20: Pale Blue Tinted Gloss Composition | |
|---|---|
| White Polyester Gloss Base | 967 g |
| Blue Polyester Colorant Additive | 30 g |
| Dry Blend Additive 2 | 3 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto Aluminum panels to a film thickness of 50–110 microns and stoved at 200C for 15 minutes, a coating with a single homogeneous pale blue color was obtained. No variation in film appearance was observed over the range of conditions.

| Example 21: Blue Polyester Metallic Composition | |
|---|---|
| Agglomerated Blue Polyester Gloss base | 967 g |
| Mica pigment | 30 g |
| Dry Blend Additive 2 | 3 g |

The ingredients were dry blended by use of a Waring Laboratory high shear blender and mixed for two 5 second periods. When the powder mixture was sprayed at an application voltage of −50 to −100 kV (Ransberg Gema PG 1 gun) onto Aluminum panels to a film thickness of 50–110 microns and stoved at 200° C. for 15 minutes, a coating with a blue metallic color was obtained. No variation in film appearance was observed over the range of conditions.

What is claimed is:

1. A powder coating composition comprising a dry-blend mixture of the following particulate components (a), (b) and (c):
   (a) a film-forming polymeric component having:
       (p1) a d(v,50) of from 25 to 50 microns,
       (p2) a d(v,70) of from 25 to 70 microns, or
       (p3) no more than 70% by volume of the particles being less than 50 microns;
   (b) at least one appearance-modifying additive component; and
   (c) a further additive component comprising wax-coated silica or consisting essentially of alumina and aluminum hydroxide,
   wherein the film-forming component having particle size (p1), (p2) or (p3) constitutes at least 60% by weight of the composition.

2. The powder coating composition of claim 1, wherein at least 60% by weight of the composition comprises the film-forming polymeric component exhibiting a d(v,70) of from 25 to 70 microns and a d(v,20) of from 8 to 30 microns.

3. The powder coating composition of claim 1, wherein the at least one appearance-modifying additive component (b) comprises:
   (1) a gloss-reducing additive component;
   (2) a texturing agent component;
   (3) a metallic or mica pigment, optionally bonded to a second film-forming polymeric material;
   (4) a coloring pigment;
   (5) a third film-forming polymeric material, compatible with the film-forming component (a) and different in color therefrom, and in which at least 90% by volume of the particles are no more than 20 microns, or
   (6) a fourth film-forming polymeric material, compatible with the film-forming component (a) and different in color therefrom, and having: (i) a d(v,50) of from 25 to 50 microns and a d(v,99) of from 60 to 120 microns, or (ii) no more than 70% by volume of the particles being less than 50 microns,
and wherein the composition contains at least 60% by weight of film-forming polymeric material(s), which collectively have: (i) a d(v,50) of from 25 to 50 microns and a d(v,99) of from 60 to 120 microns, or (ii) no more than 70% by volume of the particles being less than 50 microns.

4. The powder coating composition of claim 3, which contains a metallic or mica pigment in an amount of no more than 10% by weight.

5. The powder coating composition of claim 4, wherein the metallic or mica pigment component:
   comprises a metallic or mica pigment bonded to an uncolored film-forming polymeric material having a d(v,50) of from 15 to 50 microns or a d(v,70) of from 20 to 70 microns; and
   contains 2 to 40% by weight of metallic or mica pigment bonded to the uncolored film-forming polymeric material.

6. The powder coating composition of claim 1, wherein the composition comprises at least 70% by weight of a colored film-forming polymeric material of the particle size (p1), (p2), or (p3).

7. The powder coating composition of claim 3, which contains a gloss-reducing additive in an amount of no more than 30% by weight, based on the total weight of the composition.

8. The powder coating composition of claim 7, wherein the film-forming polymeric component (a) comprises a first acid-functional polyester, and wherein the gloss-reducing component (b) comprises an uncolored film-forming polymeric material comprising a second acid-functional polyester, which has a higher functionality than the first acid-functional polyester.

9. The powder coating composition of claim 8, wherein the gloss-reducing additive has a particle size such that at least 90% by volume of particles are less than 50 microns and such that the mean particle size is less than 30 microns.

10. The powder coating composition of claim 3, wherein the texturing agent is present in an amount of no more than 5% by weight, based on the total weight of the composition.

11. The powder coating composition of claim 3, which contains a coloring pigment or a colored film-forming polymeric material in an amount of no more than 5% by weight, based on the total weight of the composition, in which pigment or polymeric material at least 90% by volume of the particles are no more than 20 microns, and which pigment or polymeric material is compatible with the film-forming component (a).

12. The powder coating composition of claim 1, wherein the further additive component (c) is present in an amount of no more than 5% by weight, based on the weight of the total composition.

13. The powder coating composition of claim 1, wherein the film-forming polymeric material of the specified particle size (p1), (p2) or (p3) is or includes a particulate powder in the form of a fused or bonded agglomerate consisting of composite particles.

14. The powder coating composition of claim 1, wherein at least 60% by weight of the composition comprises film-forming polymeric material exhibiting a d(v,50) of from 35 to 45 microns and a d(v,99) of from 80 to 100 microns.

15. The powder coating composition of claim 1, wherein at least 60% by weight of the composition comprises film-forming polymeric material exhibiting a d(v,70) of from 25 to 70 microns, and wherein the further additive (c) comprises wax-coated silica.

16. The powder coating composition of claim 1, wherein:
   component (a) comprises film-forming polymeric material exhibiting a d(v,70) of from 25 to 70 microns; and
   the at least one appearance-modifying additive component (b) includes one or more of: a gloss-reducing component, a texturing component, a metallic or mica pigment bonded to a film-forming polymeric material, a non-bonded metallic or mica pigment (in which case at least one film-forming polymeric component comprises a particulate fused or bonded agglomerate consisting of composite particles), a coloring pigment or pigment concentrate, or a second film-forming polymeric material compatible with and different in color from the first film-forming component (a), in which second film-forming material at least 90% by volume of the particles are no more than 20 microns.

17. The powder coating composition of claim 1, wherein at least 60% by weight of the composition comprises film-forming polymeric material exhibiting a d(v,70) of from 25 to 70 microns and is or includes a particulate powder in the form of a fused or bonded agglomerate consisting of composite particles.

18. The powder coating composition of claim 1, wherein at least 60% by weight of the composition comprises film-forming polymeric material exhibiting a d(v,70) of from 40 to 60 microns and a d(v,20) of from 15 to 25 microns.

19. A powder coating composition comprising a dry-blend mixture of the following particulate components (a), (b) and (c):
   (a) a colored film-forming polymeric material: (1) having a d(v,50) in the range of from 25 to 50 microns and a d(v,99) in the range of from 60 to 120 microns, or (2) in which no more than 70% by volume of the particles are less than 50 microns;
   (b) at least one appearance-modifying additive comprising:
      (1) a gloss-reducing additive component,
      (2) a texturing agent component,
      (3) a metallic or mica pigment, optionally bonded to a film-forming polymeric material,
      (4) a coloring pigment or a pigment concentrate,
      (5) a film-forming polymeric material, compatible with the film-forming component (a) and different in color therefrom, and in which at least 90% by volume of the particles are no more than 20 microns, or
      (6) a film-forming polymeric material, compatible with the film-forming component (a) and different in color therefrom, and either: (1) having a d(v,50) in the range of from 25 to 50 microns and a d(v,99) in the range of from 60 to 120 microns, or (2) in which no more than 70% by volume of the particles are less than 50 microns; and (c) a further additive selected from the group consisting of:
   (i) alumina together with aluminum hydroxide,
   (ii) alumina together with wax-coated silica,
   (iii) aluminum hydroxide together with wax-coated silica,
   (iv) alumina together with aluminum hydroxide and wax-coated silica, and
   (v) wax-coated silica, wherein the composition contains at least 60% by weight of the film-forming polymeric material(s), which collectively have a d(v,50) of from 25 to 50 microns and a d(v,99) of from 60 to 120 microns, or in which no more than 70% by volume of the particles are less than 50 microns.

20. A kit comprising the following separate particulate components for dry-blend mixing into powder coating compositions for the preparation of powder coatings in a number of different finishes:

(a) at least one appearance-modifying additive comprising:
   (1) a gloss-reducing component,
   (2) a texturing component,
   (3) a metallic or mica pigment component,
   (4) a coloring pigment or pigment concentrate component, or
   (5) a colored film-forming polymeric material having a d(v,90) of no more than 20 microns; and (b) a further additive comprising wax-coated silica or consisting essentially of alumina and aluminum hydroxide.

21. The kit of claim 20, which includes components (1), (2), and (3), and optionally with one or more coloring pigments or pigment concentrates (4) or colored film-forming polymeric materials (5).

22. The kit of claim 20, wherein the at least one appearance-modifying additive is in the form of a bonded masterbatch in which a non-film-forming additive is bonded to a film-forming polymeric component.

23. The kit of claim 20, which further includes an uncolored film-forming polymeric material.

24. The powder coating composition of claim 1, wherein the further additive component (c) is selected from the group consisting of:
   (i) alumina together with aluminum hydroxide,
   (ii) alumina together with wax-coated silica,
   (iii) aluminum hydroxide together with wax-coated silica,
   (iv) alumina together with aluminum hydroxide and wax-coated silica, and
   (v) wax-coated silica.

25. The powder coating composition of claim 24, wherein the further additive component (c) is selected from the group consisting of:
   (i) alumina together with aluminum hydroxide,
   (ii) alumina together with wax-coated silica,
   (iii) aluminum hydroxide together with wax-coated silica, and
   (iv) alumina together with aluminum hydroxide and wax-coated silica.

26. The powder coating composition of claim 25, wherein the further additive component (c) is selected from the group consisting of:
   (i) alumina together with aluminum hydroxide,
   (ii) alumina together with wax-coated silica, and
   (iii) alumina together with aluminum hydroxide and wax-coated silica.

27. The powder coating composition of claim 26, wherein the further additive component (c) is alumina together with aluminum hydroxide.

28. The powder coating composition of claim 16, wherein component (c) comprises alumina together with aluminum hydroxide.

29. The powder coating composition of claim 1, wherein at least one appearance-modifying additive component is in the form of a bonded masterbatch in which a non-film-forming additive is bonded to a film-forming polymeric material to form a fused or bonded agglomerate consisting of composite particles.

30. The powder coating composition of claim 1, which includes one of the following particulate components:
   a gloss-reducing component and a texturing component;
   a gloss-reducing component and a metallic pigment component or mica pigment component;
   a texturing component and a metallic pigment component or mica pigment component; or
   a texturing component and a coloring pigment.

31. The powder coating composition of claim 1, wherein the film-forming component having particle size (p1), (p2) or (p3) and constituting at least 60% by weight of the composition is thermosetting.

32. The powder coating composition of claim 19, wherein the further additive component (c) is selected from the group consisting of:
   (i) alumina together with aluminum hydroxide;
   (ii) alumina together with wax-coated silica; and
   (iii) alumina together with aluminum hydroxide and wax-coated silica.

33. The powder coating composition of claim 32, wherein the further additive component (c) is alumina together with aluminum hydroxide.

34. The powder coating composition of claim 19, wherein the film-forming polymeric material (a) comprises a first acid-functional polyester having a first functionality, and wherein the composition includes a particulate gloss-reducing component comprising an uncolored film-forming polymeric material having reduced particle size and comprising a second acid-functional polyester having a second functionality that is higher than the functionality of the first acid-functional polyester.

35. The powder coating composition of claim 19, wherein the film-forming component having particle size (p1), (p2) or (p3) constituting the at least 60% by weight of the composition is thermosetting.

36. A powder coating composition which comprises a dry-blend mixture of the following particulate components (a), (b) and (c):

(a) a film-forming polymeric component, (b) a gloss-reducing component, a texturing component, a metallic pigment component or mica pigment component, a coloring pigment or a pigment concentrate, a further film-forming polymeric component compatible with the first film-forming polymeric component and different in coloration therefrom, or two or more such components, and (c) a further additive selected from the group consisting of:
  (i) alumina together with aluminum hydroxide;
  (ii) alumina together with wax-coated silica;
  (iii) aluminum hydroxide together with wax-coated silica;
  (iv) alumina together with aluminum hydroxide and wax-coated silica; and
  (v) wax-coated silica,
and wherein the composition comprises, in an amount of at least 60% by weight of the composition, a film-forming polymeric component:
  (p1) having a d(v,50) in the range of from 25 to 50 microns, or
  (p2) having a d(v,70) in the range of from 25 to 70 microns and a d(v,20) in the range of from 8 to 30 microns, or
  (p3) in which no more than 70% by volume of the particles are less than 50 microns.

37. The powder coating composition of claim 36, wherein the further additive component (c) is selected from the group consisting of:
  (i) alumina together with aluminum hydroxide;
  (ii) alumina together with wax-coated silica; and
  (iii) alumina together with aluminum hydroxide and wax-coated silica.

38. The powder coating composition of claim 37, wherein the further additive component (c) is alumina together with aluminum hydroxide.

39. The powder coating composition of claim 36, wherein the film-forming polymeric material (a) comprises a first acid-functional polyester having a first functionality, and wherein the composition includes a particulate gloss-reducing component comprising an uncolored film-forming polymeric material having reduced particle size and comprising a second acid-functional polyester having a second functionality that is higher than the functionality of the first acid-functional polyester.

40. The powder coating composition of claim 36, wherein the film-forming component having particle size (p1), (p2) or (p3) and constituting at least 60% by weight of the composition is thermosetting.

41. A powder coating composition which comprises a dry-blended mixture of the following particulate components:
  a) at least one colored film-forming polymeric material:
    (p1) having a d(v,50) in the range of from 25 to 50 microns and a d(v,99) in the range of from 60 to 120 microns,
    (p2) having a d(v,70) in the range of from 25 to 70 microns and a d(v,20) in the range of from 8 to 30 microns, or
    (p3) in which no more than 70% by volume of the particles are less than 50 microns, and
  b) at least one appearance-modifying additive component selected from
    1) a gloss-reducing component,
    2) a texturing component,
    3) a metallic or mica pigment optionally bonded to uncolored film-forming polymeric material having a d(v,50) in the range of from 15 to 50 microns, or a d(v,70) in the range of from 20 to 70 microns
    4) a coloring pigment or a pigment concentrate, or
    5) a colored film-forming polymeric component compatible with the first film-forming polymeric component and differing in coloration therefrom, in which at least 90% by volume of the particles are no more than 20 microns,
    6) a film-forming polymeric material compatible with the film-forming component (a) and of different color therefrom, and having a particle size p1, p2 or p3 defined above, and
  c) a further additive selected from the group consisting of:
    alumina together with aluminum hydroxide;
    wax-coated silica together with alumina and/or with aluminum hydroxide; and
    wax-coated silica;
  wherein the film-forming polymeric material of component (a) and optional component (b6) and any film-forming polymeric material bonded to metallic or mica pigment in optional component (b3) and satisfying the criterion (p1), (p2) or (p3), together constitute at least 60% of the composition by weight.

42. The powder coating composition of claim 41, wherein the further additive component (c) is selected from the group consisting of:
  (i) alumina together with aluminum hydroxide;
  (ii) alumina together with wax-coated silica;
  (iii) aluminum hydroxide together with wax-coated silica; and
  (iv) alumina together with aluminum hydroxide and wax-coated silica.

43. The powder coating composition of claim 42, wherein the further additive component (c) is selected from the group consisting of:
  (i) alumina together with aluminum hydroxide;
  (ii) alumina together with wax-coated silica; and
  (iii) alumina together with aluminum hydroxide and wax-coated silica.

44. The powder coating composition of claim 43, wherein the further additive component (c) is alumina together with aluminum hydroxide.

45. The powder coating composition of claim 41, wherein the film-forming polymeric material (a) comprises a first acid-functional polyester having a first functionality, and wherein the composition includes a particulate gloss-reducing component comprising an uncolored film-forming polymeric material having reduced particle size and comprising a second acid-functional polyester having a second functionality that is higher than the functionality of the first acid-functional polyester.

46. The powder coating composition of claim 41, wherein the film-forming component having particle size (p1), (p2) or (p3) and constituting at least 60% by weight of the composition is thermosetting.

47. A process for powder coating a substrate, wherein the powder coating composition of claim 1 is applied to the substrate and heated to form a continuous coating.

* * * * *